US010963331B2

(12) United States Patent
Bangalore et al.

(10) Patent No.: US 10,963,331 B2
(45) Date of Patent: Mar. 30, 2021

(54) COLLECTING REPEATED DIAGNOSTICS DATA FROM ACROSS USERS PARTICIPATING IN A DOCUMENT COLLABORATION SESSION

(71) Applicant: Microsoft Technology Licensing, LLC, Redmond, WA (US)

(72) Inventors: Ramesh Bangalore, Redmond, WA (US); Chaitanya Gogineni, Redmond, WA (US); Vijay Mohan, Bellevue, WA (US); Sushma Ashwin Rao, Remond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 16/218,940

(22) Filed: Dec. 13, 2018

(65) Prior Publication Data

US 2020/0192736 A1 Jun. 18, 2020

(51) Int. Cl.
*G06F 11/07* (2006.01)
*H04L 12/18* (2006.01)
(Continued)

(52) U.S. Cl.
CPC ........ *G06F 11/079* (2013.01); *G06F 11/0706* (2013.01); *G06F 11/0778* (2013.01);
(Continued)

(58) Field of Classification Search
CPC ............... G06F 11/079; G06F 11/0706; G06F 11/0778; G06F 11/261; H04L 12/1813; H04L 65/403; H04L 67/145; H04L 67/146
See application file for complete search history.

(56) References Cited

U.S. PATENT DOCUMENTS 7,500,916 B2    3/2009 Lieberman et al.
7,937,442 B2*   5/2011 Sekaran .............. H04L 12/1827
                                              709/204
(Continued)

FOREIGN PATENT DOCUMENTS

WO    2015031174 A1    3/2015
WO    2018005216 A1    1/2018

OTHER PUBLICATIONS

"International Search Report and Written Opinion Issued in PCT Application No. PCT/US2019/064802", dated Mar. 2, 2020, 14 Pages.

*Primary Examiner* — Yolanda L Wilson
(74) *Attorney, Agent, or Firm* — Michael Best & Friedrich LLP

(57) ABSTRACT

Systems and methods for error detection within a multi-session collaborative environment. One method includes receiving, from a first client application session associated with a first user, a first diagnostic log, including an error message. The method includes determining a second client application session associated with a second user in a collaboration session with the first client session, and triggering, in the second client application session, an artificial error condition based on the error message. The method includes, receiving, from the second client application session, a second diagnostic log. The method includes tagging the first and second diagnostic logs with a session identifier indicative of the collaboration session, and transmitting the first and second diagnostic logs to a collaborative environment administrator. The method includes transmitting a notification based on the error to at least one of the first client application session and the second client application session.

20 Claims, 2 Drawing Sheets

(51) Int. Cl.
*H04L 29/06* (2006.01)
*H04L 29/08* (2006.01)

(52) U.S. Cl.
CPC ........ *H04L 12/1813* (2013.01); *H04L 65/403* (2013.01); *H04L 67/145* (2013.01); *H04L 67/146* (2013.01)

(56) References Cited

U.S. PATENT DOCUMENTS

| | | | |
|---|---|---|---|
| 8,024,661 B2 * | 9/2011 | Bibliowicz | G06Q 10/10 |
| | | | 715/751 |
| 8,553,867 B2 * | 10/2013 | Callanan | H04L 12/1822 |
| | | | 379/204.01 |
| 9,590,880 B2 | 3/2017 | Ashby et al. | |
| 2007/0004389 A1 * | 1/2007 | Wallace | H04L 65/403 |
| | | | 455/415 |
| 2007/0038896 A1 | 2/2007 | Champlin et al. | |
| 2010/0146085 A1 * | 6/2010 | Van Wie | H04L 67/1059 |
| | | | 709/220 |
| 2012/0198268 A1 | 8/2012 | Qureshi | |
| 2015/0227405 A1 | 8/2015 | Jan et al. | |
| 2015/0242262 A1 * | 8/2015 | Ranganathan | G06F 11/3466 |
| | | | 714/37 |
| 2016/0004629 A1 * | 1/2016 | Bharara | G06F 11/079 |
| | | | 714/38.1 |
| 2016/0044070 A1 * | 2/2016 | Panicker | H04L 65/1069 |
| | | | 709/204 |
| 2016/0204992 A1 | 7/2016 | Wu et al. | |
| 2018/0300197 A1 * | 10/2018 | Marron | G06F 11/3628 |
| 2018/0329803 A1 * | 11/2018 | Petersen | G06F 11/0778 |

* cited by examiner

COLLECTING REPEATED DIAGNOSTICS DATA FROM ACROSS USERS PARTICIPATING IN A DOCUMENT COLLABORATION SESSION

FIELD

Embodiments described herein relate to detecting errors in a multi-user collaboration environment.

SUMMARY

Collaborative computing systems allow multiple users on multiple computing devices to simultaneously access shared content. For example, a collaboration server may present a word processing document to multiple remote users in a collaboration session. Each of the users accesses the document with a client word processor application session. All of the users in the collaboration session can view the document and edit its content. The collaboration server receives document changes from the client application sessions, coordinates the changes, and pushes the coordinated changes to the client application sessions.

In some instances, a client application session experiences an error. For example, change submitted by a client application may not be accepted by the collaboration server. In order to diagnose the error, and help to prevent future errors, errors are logged at the client device. Diagnostic logs are sent from the client devices to the provider of the collaboration environment, where they can be examined to determine a cause of the error. However, in some cases, another user in the collaborative session causes the error, but does not experience it. For example, one user in a session may have an older version of the client application, may have introduced corrupt data into the collaboration session, or the like. In these cases, analysis of the single diagnostic log fails to identify the cause of the error. When an analysis fails, diagnostic logs from other client sessions may be requested. However, collaborators may not be reachable after the fact, the logs may be unavailable, or may not include the relevant time period. Furthermore, it may be difficult to synchronize the log data across multiple client application sessions without a reference point.

Accordingly, to provide a more complete picture of the circumstances surrounding the error, embodiments described herein collect diagnostic logs from all users in the collaborative session in near real time when an error occurs. Upon receipt of an error message from one client application session, some examples described herein generate a synthetic error in the other client application sessions participating in the collaborative session. Therefore, rather than receiving a single diagnostic log, example systems and methods described herein receive diagnostic logs for every user in the session. In addition, because each client application logs the same error at almost the same time, the diagnostic logs may be synched for more accurate analysis. Some embodiments automatically notify affected users of the errors and provide remediation steps. Using the embodiments presented herein, errors are detected more quickly, and thus repeated less often, resulting in a better user experience. Embodiments described herein therefore result in more efficient use of collaboration system resources, and the improved operation of the collaboration systems for users.

In particular, one embodiment provides a system for error detection within a multi-session collaborative environment. The system includes a communication interface, and an electronic processor coupled to the communication interface. The electronic processor is configured to receive, from a first client application session associated with a first user, a first diagnostic log, the first diagnostic log including an error message. The electronic processor is configured to determine a second client application session associated with a second user in a collaboration session with the first client session. The electronic processor is configured to trigger, in the second client application session, an artificial error condition based on the error message. The electronic processor is configured to, in response to triggering the artificial error condition, receive, from the second client application session, a second diagnostic log. The electronic processor is configured to tag the first and second diagnostic logs with a session identifier indicative of the collaboration session. The electronic processor is configured to transmit, via the communication interface, the first and second diagnostic logs to a collaborative environment administrator. The electronic processor is configured to transmit, via the communication interface, a notification based on the error to at least one selected from the group consisting of the first client application session and the second client application session.

Another embodiment provides a method for error detection within a multi-session collaborative environment. The method includes receiving, from a first client application session associated with a first user, a first diagnostic log, the first diagnostic log including an error message. The method includes determining, with an electronic processor, a second client application session associated with a second user in a collaboration session with the first client session. The method includes triggering, in the second client application session, an artificial error condition based on the error message. The method includes, in response to triggering the artificial error condition, receiving, from the second client application session, a second diagnostic log. The method includes tagging the first and second diagnostic logs with a session identifier indicative of the collaboration session. The method includes transmitting, via a communication interface, the first and second diagnostic logs to a collaborative environment administrator. The method includes transmitting a notification based on the error to at least one selected from the group consisting of the first client application session and the second client application session.

Yet another embodiment provides a non-transitory computer-readable medium including instructions executable by an electronic processor to perform a set of functions. The set of functions includes receiving, from a first client application session associated with a first user, a first diagnostic log, the first diagnostic log including an error message. The set of functions includes determining, with an electronic processor, a second client application session associated with a second user in a collaboration session with the first client session. The set of functions includes triggering, in the second client application session, an artificial error condition based on the error message. The set of functions includes, in response to triggering the artificial error condition, receiving, from the second client application session, a second diagnostic log. The set of functions includes tagging the first and second diagnostic logs with a session identifier indicative of the collaboration session. The set of functions includes transmitting, via a communication interface, the first and second diagnostic logs to a collaborative environment administrator. The set of functions includes determining a remediation step. The set of functions includes transmitting a notification, based on the error and including the remediation step, to at least one selected from the group consisting of the first client application session and the second client application session.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
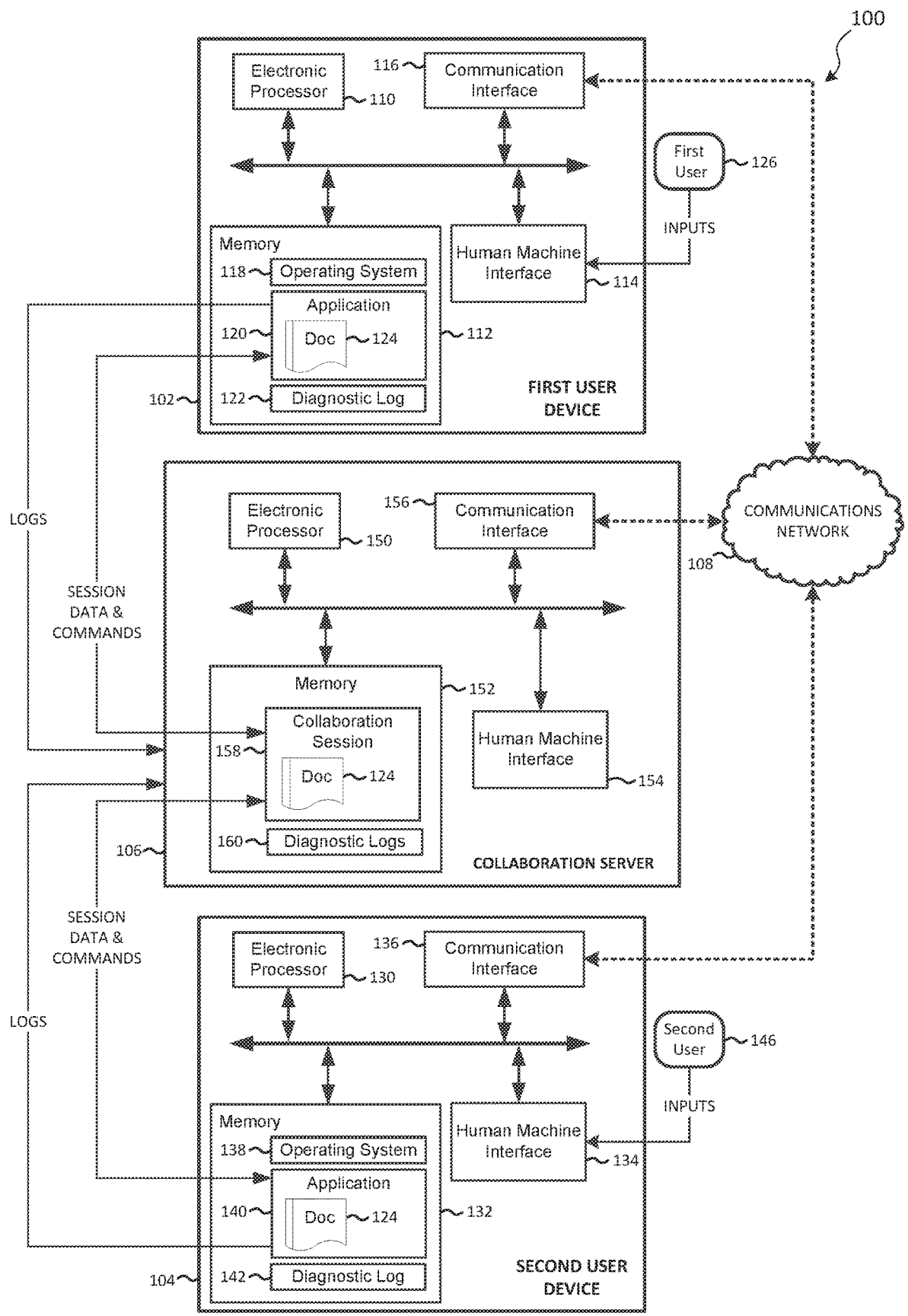
FIG. 1 schematically illustrates a collaborative computing system according to some embodiments.

For example, FIG. 1 illustrates an example system 100 for executing a collaborative computing environment. As illustrated in FIG. 1, the system 100 includes a first user device 102, a second user device 104, and a collaboration server 106. It should be understood that the system 100 is provided as one example and, in some embodiments, the system 100 may include additional components. In particular, the system 100 may include more than two user devices and the functionality described herein as being performed by the collaboration server 106 may be combined and distributed in various configurations. For example, in some embodiments, the functionality of the collaboration server 106 may be performed by one or more servers or other hardware components of a cloud computing platform, for example, the Microsoft® Azure® platform.

The first user device 102, second user device 104, and collaboration server 106 are communicatively coupled by at least one communications network 108. The communications network 108 may be implemented using a wide area network (for example, the Internet), a local area network (for example, an Ethernet or Wi-Fi™ network), a cellular data network (for example, a Long Term Evolution (LTE™) network), and combinations or derivatives thereof. In some embodiments, rather than or in addition to communicating over the communications network 108, first user device 102, second user device 104, and collaboration server 106, or combinations thereof, may communicate over one or more dedicated (wired or wireless) connections.

The first user device 102 is a computing device, for example, a laptop computer, desktop computer, tablet computer, computer terminal, smart telephone, smart watch, smart television, and the like. In the example illustrated in FIG. 1, the first user device 102 includes an electronic processor 110 (for example, a microprocessor, application-specific integrated circuit (ASIC), or other suitable electronic device configured to execute instructions), a memory 112, a human machine interface 114, and a communication interface 116. The electronic processor 110, the memory 112, the human machine interface 114, and the communication interface 116 are communicatively coupled over one or more communication lines or buses, wirelessly, or combinations thereof. It should be understood that, in other constructions, the first user device 102 includes additional, fewer, or different components than those illustrated in FIG. 1.

The communication interface 116 may include a wireless transmitter or transceiver for wirelessly communicating over the communications network 108. Alternatively or in addition to a wireless transmitter or transceiver, the communication interface 116 may include a port for receiving a cable, for example, an Ethernet cable, for communicating over the communications network 108 or a dedicated wired connection. It should be understood that, in some embodiments, the first user device 102 communicates with the collaboration server 106 through one or more intermediary devices, for example, routers, gateways, relays, and the like.

The memory 112 includes a non-transitory, computer-readable storage medium storing program instructions and data. The electronic processor 110 is configured to retrieve from the memory 112 and execute, among other things, software (executable instructions) to perform a set of functions, including the methods described herein. As illustrated in FIG. 1, in some embodiments, the memory 112 stores an operating system (OS) 118, a software application 120, and a diagnostic log 122. As used herein, the term diagnostic log refers to one or more electronic logs created or updated by the operating system 118, the software application 120, or both. Diagnostic logs include log entries detailing OS and application events, errors, warnings, inputs, outputs, and the like relating to the performance of the operating system 118, the software application 120, or both.

The memory 112 also stores a document 124 (for example, as created or modified by the software application 120). It should be understood that the memory 112 may store additional applications, data, or combinations thereof. Also, in some embodiments, the operating system 118, the software application 120, the diagnostic log 122, and the document 124 may be stored in separate memories.

The operating system 118 may be, for example, one of the Windows® family of operating systems provided by Microsoft® Corporation. The operating system 118, when executed by the electronic processor 110, may control use of the components included in the user device 102, including the electronic processor 110, the memory 112, the human machine interface 114, the communication interface 116, or combinations thereof.

The software application 120, when executed by the electronic processor 110, allows a user (for example, the first user 126) to, for example, access, create, edit, store, transmit, and receive data, for example, the document 124. For example, the software application 120 may include a word processing application, a spreadsheet application, a communication application (for example, an email client application, a video chat application, and the like), a drawing application, a browser application, an application that combines functions of the foregoing, or the like. In some embodiments, the software application 120 is one of the Microsoft Office® suite of applications (for example, Outlook®, Word®, Excel®, PowerPoint®, Internet Explorer®, and the like). As set forth in detail below, the software application 120 participates in a collaborative computing session with the second user device 104 and the collaboration server 106, for example, to provide for group editing or creation of the document 124. In some embodiments, the document 124 is a locally stored copy of a document stored, for example, on the collaboration server 106.

The human machine interface (HMI) 114 receives input from, and provides output to, users (for example, the first user 126) of the first user device 102. The HMI 114 may include a keyboard, a keypad, a microphone, a camera, a cursor-control device (for example, a mouse, a joystick, a trackball, a touch pad, and the like), a display (for example, a liquid crystal display (LCD), a light emitting diode (LED) display, a touchscreen), a speaker, and the like. The HMI 114 communicates with the operating system 118 to send and receive data to and from the operating system 118 and the software application 120. In particular, input from a user of the software application 120 are communicated from the HMI 114 to the operating system 118, which conveys the input (or a portion or version thereof) to the software application 120. It should be understood that some components of the HMI 114, for example, a touchscreen, function both as an input device and an output device.

The second user device 104 is a computing device similar to the first user device 102. The second user device 104 may be, for example, a laptop computer, desktop computer, tablet computer, computer terminal, smart telephone, smart watch, smart television, and the like. In the example illustrated in FIG. 1, the second user device 104 includes an electronic processor 130 (for example, a microprocessor, application-specific integrated circuit (ASIC), or other suitable electronic device configured to execute instructions), a memory 132, a human machine interface 134, and a communication interface 136. The electronic processor 130, the memory 132, the human machine interface 134 (for receiving input from and providing output to a second user 146), and the communication interface 136 are communicatively coupled over one or more communication lines or buses, wirelessly, or combinations thereof. It should be understood that, in other constructions, the second user device 104 includes additional, fewer, or different components than those illustrated in FIG. 1. The second user device 104 is configured and operates similarly to the first user device 102. Similarly named components in the second user device 104 perform similar functions as those described above with respect to the first user device 102. In some embodiments, the second user device 104 is nearly identical to the first user device 102 (for example, both are the same model of laptop computer).

In the example provided in in FIG. 1, the collaboration server 106 is also a computing device that includes an electronic processor 150, a memory 152, an HMI 154, and a communication interface 156, which may be similar to the electronic processor 110, memory 112, HMI 114, and communication interface 116 described above for the first user device 102. The components of the collaboration server 106 are communicatively coupled over one or more communication lines or buses, wirelessly, or combinations thereof. It should be understood that, in other constructions, the collaboration server 106 includes additional, fewer, or different components than those illustrated in FIG. 1.

As described in detail herein, the collaboration server 106 provides a multi-session collaborative environment to allow groups of users (for example, the first user 126 and the second user 146) to engage with one another and with shared content. As illustrated in FIG. 1, the memory 152 includes, among other applications, data, or both, a collaboration session 158 and diagnostic logs 160. The collaboration session 158 presents shared content, for example, the document 124, to multiple remote users (for example, the first user 126 and the second user 146) accessing the collaborative environment via one or more user devices (for example, the first user device 102 and the second user device 104). All of the users in the collaboration session 158 can view the document 124, and users may be selectively allowed to control or edit the content of the document 124. As described in more detail below, the collaboration server 106 transmits and receives collaboration session data and commands to and from the user devices, for example, via the communications network 108. Session data and commands include, for example, changes made to the document 124 by users. As described in more detail below, users may experience errors during a collaboration session, which are logged locally in the diagnostic logs of their user devices. In some embodiments, logging an error triggers the application or the operating system of the user device to send the diagnostic log to the collaboration server 106, for example, to aid in debugging. The collaboration server 106 receives the diagnostic logs 160 from the first user device 102 and the second user device 104, for example, via the communications network 108.

Figure 2:
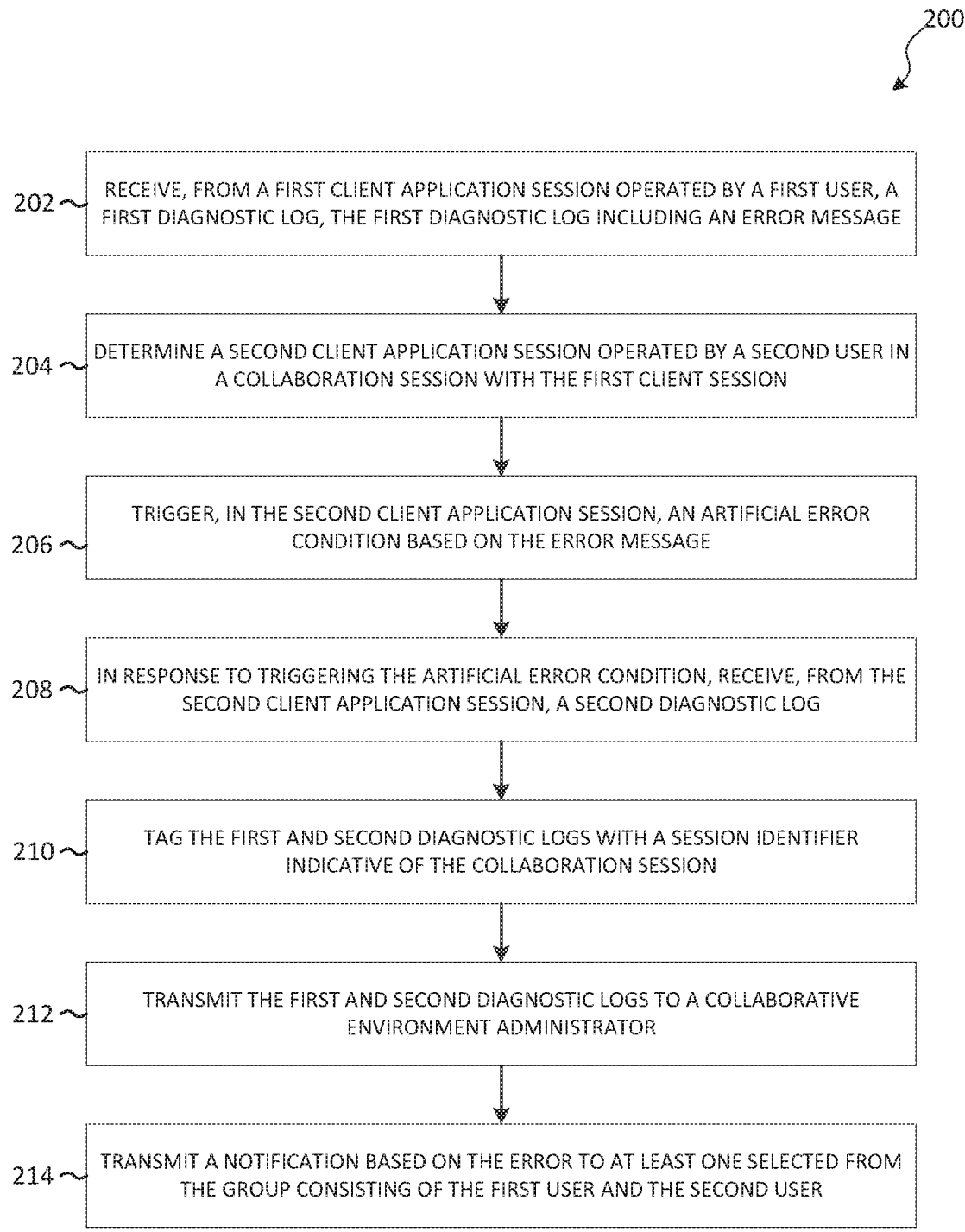
FIG. 2 is a flowchart illustrating a method of for error detection within a multi-session collaborative environment performed by the system of FIG. 1 according to some embodiments.

As noted above, errors are difficult to diagnose when diagnostic logs are only collected from the user experiencing the error, or when one attempts to collect diagnostic logs after some time has passed. Accordingly, to provide more accurate and timely reporting and analysis of errors, it is desirable to collect diagnostic logs from all users within a collaborative session when a single user experiences an error. FIG. 2 illustrates an example method 200 for error detection within a multi-session collaborative environment. The method 200 is described as being performed by the collaboration server 106 and, in particular, the electronic processor 150. However, it should be understood that in some embodiments, portions of the method 200 may be performed by other devices, including for example, the first user device 102 and the second user device 104. While FIG. 1 illustrates two user devices (the first user device 102 and the second user device 104), it should be understood that embodiments of the method 200 may be used with more user devices than illustrated. Embodiments may also include more than one collaboration server 106.

As an example, the method 200 is described in terms of the first user device 102 and the second user device 104 participating in the collaboration session 158 to edit the document 124. The first user device 102 and the second user device 104 receive inputs making changes to the document 124 from the first user 126 and the second user 146. The changes to the document 124 are sent to the collaboration server 106 as part of the collaboration session data, for example, via the communications network 108.

The collaboration server 106 receives changes for the document 124 from the first user device 102 and the second user device 104 and coordinates the changes to the document 124. For example, the first user device 102 sends a sentence to be added to the document 124, while the second user device 104 sends a replacement for a word within an existing sentence. The collaboration server 106 receives both changes to the document, placing them within the document, and identifying them with their respective users. The collaboration server 106 transmits the coordinated changes to the first user device 102 and the second user device 104. For example, the added sentence is sent to the second user device 104, which did not originate that change, so that its local copy of the document 124 includes the new sentence. Likewise, the word replacement is sent to the first user device 102. As a consequence, each of the first user device 102 and the second user device 104 have updated copies of the document 124 as the document is being edited by both of the devices' respective users.

As noted, users may experience errors during a collaboration session. In one example, the application 120 running on the first user device 102 is participating in a client application session with the collaboration session 158. The application 120 may receive an error message from the collaboration server 106 when attempting to commit a change to the document 124. The application 120 logs the error message locally in the diagnostic log 122. Logging the error message causes the application 120 (or the operating system 118) of the first user device 102 to send the diagnostic log 122 to the collaboration server 106.

At block 202, the electronic processor 150 receives, from the first client application session associated with the first user 126, a first diagnostic log (the diagnostic log). As noted, the first diagnostic log includes the error message received when the change commit failed.

At block 204, the electronic processor 150 determines a second client application session associated with a second user in the collaboration session 158 with the first client session. For example, in some embodiments, the electronic processor 150 queries the collaboration session 158 directly (for example, by making a subroutine call) to request the other client application sessions participating in the collaboration session. In some embodiments, the application 120 electronic processor 150 examines the diagnostic log 122 or the error message to determine a session identifier indicative of the collaboration session 158. Using the session identifier, the electronic processor 150 determines which other client application sessions are participating in the collaboration session identified by the session identifier. In some embodiments, the electronic processor 150 determines the second client application session by querying a database, for example, stored in the memory 152. In this example, the second client application session within the collaboration session 158 is the application 140 associated with the second user 146 on the second user device 104.

At block 206, having determined the second client application session, the electronic processor 150 triggers, in the second client application session, an artificial error condition based on the error message. In one example, the collaboration server 106 sends a duplicate of the error message to the second user device 104. The artificially generated error is received by the application 140, and logged in the diagnostic log 142. As with the first user device 102, when the error is logged by the second user device 104, it causes the application 140 (or the operating system 138) of the second user device 104 to send the diagnostic log 142, which includes the artificially generated error, to the collaboration server 106. In some embodiments, the logging of the error causes the application 140 (or the operating system 138) of the second user device 104 to send multiple logs. In some embodiments, the application 140 or the operating system 138 tags the diagnostic log 142 with a collaborative session identifier, and sends the logs to an external storage service.

Accordingly, at block 208, in response to triggering the artificial error condition, the electronic processor 150 receives, from the second client application session (of the application 140), a second diagnostic log (the diagnostic log 142). In some embodiments, the collaboration server 106 sends a special error message, different from the errors caused by operation of the client application sessions. For example, the error message may include data identifying an error type for the error message received from the first client application session, an indication that the error is artificial, and the like. The special error message would still cause the client application session receiving it to transmit its diagnostic log, and could be used to differentiate the artificially triggered diagnostic logs from the log sent originally.

At block 210, the electronic processor 150 tags the first and second diagnostic logs with the session identifier indicative of the collaboration session 158. For example, the electronic processor 150 may append the log files with metadata including the session identifier. In another example, the electronic processor 150 may insert the session identifier directly into the diagnostic logs, using a predetermined format. In some embodiments, the first and second diagnostic logs are merged into a single file, which is tagged with the session identifier. In some embodiments, the diagnostic logs are tagged with a session identifier at the user device prior to transmission to the collaboration server.

As noted, analyzing the diagnostic logs of all members of a collaborative session may allow a system administrator to determine the cause of the original error. Accordingly, at block 212, the electronic processor 150 transmits (for example, via the communication interface 156) the first and second diagnostic logs to a collaborative environment administrator. In some embodiments, the logs are presented to a collaborative environment administrator using the human machine interface 154 of the collaboration server 106. In some embodiments, the logs are transmitted to another system or device for further analysis by the collaborative environment administrator.

At block 214, the electronic processor 150 transmits, via the communication interface 156, a notification based on the error to the first user 126, the second user 146, or both. For example, the collaboration server 106 may send a notification to the second user 146, who otherwise would not be aware of the error message received by the first user 126, that an error has occurred. In another example, the first user 126, the second user 146, or both may be notified that the error report has been received. The notification may include information regarding the nature of the error, the identity of the user who first received the error message, a warning that their copy of the document 124 may not be up to date, an instruction to save a backup copy of the document 124 outside of the collaboration session 158, an instruction to merge the changes to the document 124 manually, and the like.

In some embodiments, the electronic processor 150 receives, from the collaborative environment administrator, a remediation step based on the error. For example, the collaborative environment administrator determines that the error was not the caused by the first application session, but by corrupt data received from the second application session. In this example, the electronic processor 150 receives a remediation step for the second user 146 to perform to correct the corrupt data. For example, the remediation step may include running a disk utility to repair locally stored data, discarding the local copy of the document 124 in favor of a fresh copy from the collaboration server 106, checking network connectivity, updating the application 140, and the like.

In some embodiments, the electronic processor 150 determines, automatically, a potential source and a remediation step for the error. In some embodiments, the electronic processor 150 determines that one or more users' applications need updating. For example, the application 140 may be an earlier version of the application 120. Because version mismatch may cause errors in collaborative sessions, the notification transmitted to the second user 146 includes an instruction to upgrade the application used to access the collaborative environment. In another example, the error message may be associated with a type of error known to have been resolved by a software patch. In such cases, the notification may include an instruction to the install the software patch.

The method 200 is described above in terms of two user devices collaborating on a single document. However, it should be understood that the method 200 is applicable to other collaborative computing scenarios, including those with more than two user devices and more than one collaborative session.

Various features and advantages of some embodiments are set forth in the following claims.

What is claimed is:

1. A computer system for error detection within a multi-session collaborative environment, the computer system comprising:
   a communication interface, and
   an electronic processor coupled to the communication interface and configured to
   receive, from a first client application session associated with a first user, a first diagnostic log, the first diagnostic log including an error message indicating an error;
   determine a second client application session associated with a second user in a collaboration session with the first client session;
   trigger, in the second client application session, an artificial error condition based on the error message;
   in response to triggering the artificial error condition, receive, from the second client application session, a second diagnostic log;
   tag the first and second diagnostic logs with a session identifier indicative of the collaboration session;
   transmit, via the communication interface, the first and second diagnostic logs to a collaborative environment administrator; and
   transmit, via the communication interface, a notification based on the error to at least one selected from the group consisting of the first client application session and the second client application session.

2. The system of claim 1, wherein
   the electronic processor is further configured to determine a remediation step; and
   the notification includes the remediation step.

3. The system of claim 2, wherein the remediation step is one selected from the group consisting of running a disk utility to repair locally stored data, discarding a local copy of a document, checking network connectivity, and updating a software application.

4. The system of claim 2, wherein the electronic processor is further configured to determine a remediation step by receiving the remediation step from the collaborative environment administrator.

5. The system of claim 1, wherein the electronic processor is further configured to determine a second client application session by querying at least one selected from the group consisting of the collaboration session and a database.

6. The system of claim 1, wherein the electronic processor is further configured to trigger an artificial error condition by transmitting, to the second client application session, a duplicate of the error message.

7. The system of claim 1, wherein the electronic processor is further configured to trigger an artificial error condition by transmitting, to the second client application session, a special error message based on the error message.

8. The system of claim 1, wherein the electronic processor is further configured to tag the first and second diagnostic logs with a session identifier indicative of the collaboration session by performing one selected from the group consisting of appending the first and second diagnostic logs with metadata including the session identifier and inserting the session identifier directly into the first and second diagnostic logs.

9. The system of claim 1, wherein the electronic processor is further configured to merge the first and second diagnostic logs into a single file.

10. The system of claim 1, wherein the notification includes at least one selected from the group consisting of information regarding the nature of the error, the identity of the user who first received the error message, a warning that a copy of a document being edited may not be up to date, an instruction to save a backup copy of the document outside of the collaboration session, and an instruction to merge changes to the document manually.

11. A method for error detection within a multi-session collaborative environment, the method comprising:
   receiving, from a first client application session associated with a first user, a first diagnostic log, the first diagnostic log including an error message indicating an error;
   determining, with an electronic processor, a second client application session associated with a second user in a collaboration session with the first client session;
   triggering, in the second client application session, an artificial error condition based on the error message;
   in response to triggering the artificial error condition, receiving, from the second client application session, a second diagnostic log;

tagging the first and second diagnostic logs with a session identifier indicative of the collaboration session;

transmitting, via a communication interface, the first and second diagnostic logs to a collaborative environment administrator; and transmitting a notification based on the error to at least one selected from the group consisting of the first client application session and the second client application session.

12. The method of claim 11, further comprising:
determining a remediation step, wherein transmitting a notification includes transmitting the remediation step.

13. The method of claim 12, wherein determining a remediation step includes receiving the remediation step from the collaborative environment administrator.

14. The method of claim 11, wherein determining a second client application session includes querying at least one selected from the group consisting of the collaboration session and a database.

15. The method of claim 11, wherein triggering an artificial error condition includes transmitting, to the second client application session, a duplicate of the error message.

16. The method of claim 11, wherein triggering an artificial error condition includes transmitting, to the second client application session, a special error message based on the error message.

17. The method of claim 11, wherein tagging the first and second diagnostic logs with a session identifier indicative of the collaboration session includes one selected from the group consisting of appending the first and second diagnostic logs with metadata including the session identifier and inserting the session identifier directly into the first and second diagnostic logs.

18. The method of claim 11, further comprising:
merging the first and second diagnostic logs into a single file.

19. The method of claim 11, wherein transmitting a notification includes transmitting at least one selected from the group consisting of information regarding the nature of the error, the identity of the user who first received the error message, a warning that a copy of a document being edited may not be up to date, an instruction to save a backup copy of the document outside of the collaboration session, and an instruction to merge changes to the document manually.

20. A non-transitory computer-readable medium including instructions executable by an electronic processor to perform a set of functions, the set of functions comprising:

receiving, from a first client application session associated with a first user, a first diagnostic log, the first diagnostic log including an error message indicating an error;

determining, with an electronic processor, a second client application session associated with a second user in a collaboration session with the first client session;

triggering, in the second client application session, an artificial error condition based on the error message;

in response to triggering the artificial error condition, receiving, from the second client application session, a second diagnostic log;

tagging the first and second diagnostic logs with a session identifier indicative of the collaboration session;

transmitting, via a communication interface, the first and second diagnostic logs to a collaborative environment administrator;

determining a remediation step; and transmitting a notification, based on the error and including the remediation step, to at least one selected from the group consisting of the first client application session and the second client application session.

* * * * *